(12) United States Patent  
Nelson

(10) Patent No.: US 6,586,680 B1  
(45) Date of Patent: Jul. 1, 2003

(54) MODULAR BEND RADIUS CONTROL FIXTURE

(75) Inventor: Kevin L. Nelson, Cumming, GA (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 09/585,416

(22) Filed: Jun. 2, 2000

(51) Int. Cl.[7] ................................................ H02G 3/08
(52) U.S. Cl. ...................... 174/60; 174/59; 174/135; 385/134; 385/135
(58) Field of Search ................................ 174/60, 65 R, 174/48, 49, 68.3, 68.1, 72 R, 84 R, 59, 135; 248/65, 56, 53, 49, 68.1, 480, 200.1, 217.2; 385/134, 135; D13/155

(56) References Cited

U.S. PATENT DOCUMENTS

| | | | |
|---|---|---|---|
| 5,161,580 A | * 11/1992 | Flag | 174/68.3 |
| 5,469,893 A | * 11/1995 | Caveney et al. | 174/101 |
| 5,509,100 A | * 4/1996 | Garnett et al. | 385/134 |
| 5,640,482 A | 6/1997 | Barry et al. | |
| 5,689,604 A | 11/1997 | Janus et al. | |
| 5,701,380 A | 12/1997 | Larson et al. | |
| 5,753,855 A | * 5/1998 | Nicoli et al. | 174/49 |
| 5,839,702 A | 11/1998 | Jette | |
| 5,918,837 A | * 7/1999 | Vicain | 174/135 |
| 5,929,380 A | * 7/1999 | Carlson, Jr. et al. | 174/68.3 |
| 5,937,131 A | 8/1999 | Haataja et al. | |
| 5,987,203 A | 11/1999 | Abel et al. | |
| 5,988,570 A | * 11/1999 | Gretz | 248/74.2 |
| 6,002,089 A | 12/1999 | Hemingway et al. | |
| 6,044,194 A | 3/2000 | Meyerhoefer | |
| 6,181,862 B1 | * 1/2001 | Noble et al. | 385/134 |
| 6,263,144 B1 | * 6/2001 | Daoud | 385/135 |
| D446,190 S | * 8/2001 | Wakileh et al. | D13/155 |
| D446,191 S | * 8/2001 | Wakileh et al. | D13/155 |
| D446,505 S | * 8/2001 | Wakileh et al. | D13/155 |
| 6,271,476 B1 | * 8/2001 | Bobowick et al. | 174/135 |
| 6,310,294 B1 | * 10/2001 | Di Girolamo et al. | 174/101 |
| 6,388,193 B2 | * 5/2002 | Maynard et al. | 385/134 |

* cited by examiner

Primary Examiner—Dean A. Reichard  
Assistant Examiner—Angel R. Estrada  
(74) Attorney, Agent, or Firm—Robert A. McCann; Jay A. Saltzman; Christopher S. Clancy

(57) ABSTRACT

A reconfigurable modular bend radius control fixture system allows for customization of bend module sections to achieve a variety of configurations with only a minimal number of different parts. The system includes at least one main section having a curved surface with a predetermined radius that provides a first bend radius control surface and side walls, at least one straight side plate section removably mountable to the side walls of the main section, the side plate section having a side wall that extends beyond the curved surface when mounted, and at least one bend radius control side plate removably mountable to the side walls of the main section. The bend radius control side plate section forms a second bend radius control surface. These sections can be mounted in various configurations to form a bend radius control fixture that can be mounted to a mount member of a cable management system, such as a ladder rack. The fixture is particularly suited for assisting management of sensitive cabling, such as fiber optic cabling or category 5 and 6 cabling.

11 Claims, 6 Drawing Sheets

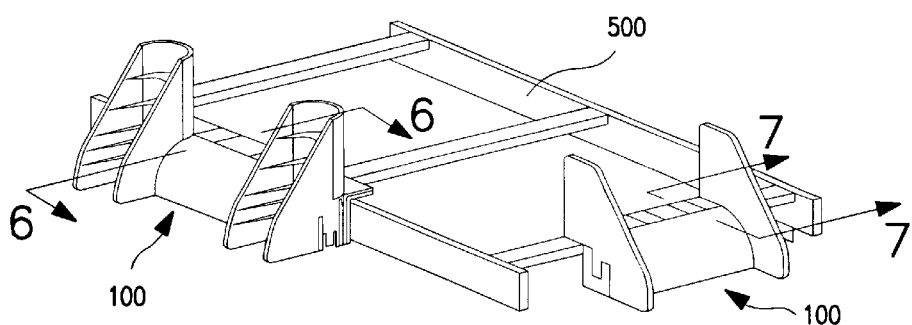
FIG. 5
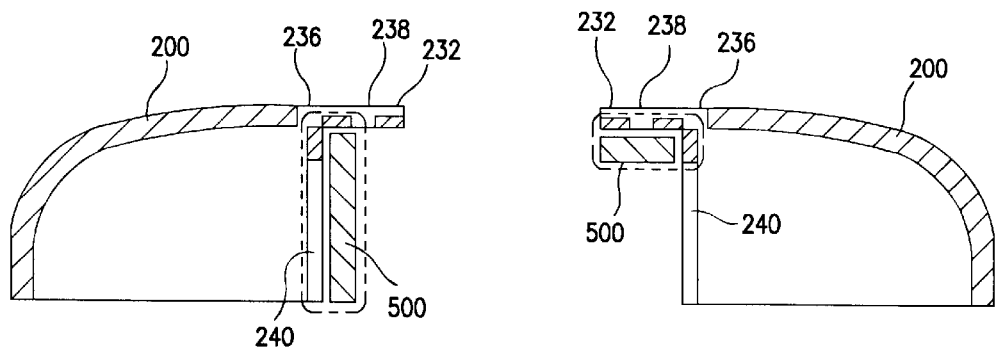
FIG. 6
FIG. 7

020
MODULAR BEND RADIUS CONTROL FIXTURE

BACKGROUND OF THE INVENTION

1. Field of Invention

The invention relates to a bend radius control fixture for use in guiding and controlling cables. In particular, the invention relates to a modular bend radius control fixture that can be readily changed to any of a number of configurations, allowing adaptation to wire management needs as they change. The invention is particularly suited for use in managing telecommunication system wiring.

2. Description of Related Art

Cabling is increasingly used in the telecommunications industry to provide data, voice, video, or audio information, as well as power. Such cabling may include various combinations of traditional metal-based wiring, such as copper cables for distributing power or audio, as well as category 5 or 6 cables with reduced cross-talk, or fiber optic cabling. These latter two types of cabling are relied upon to transmit large qualities of information and are sensitive to cable placement and orientation. Cable racks and enclosure systems have been provided to manage and organize such cables to or from equipment or cross-connect systems. These enclosure systems usually include a standard EIA 19" or 23" distribution frame rack, on which one or more enclosures are rack mounted. Such racks provide a system for managing high density fiber connections between a backbone and horizontal cabling, such as a raceway system. These racks also serve as inter-connect or cross-connect enclosures when interfacing with equipment or may serve as a telecommunications closet, allowing the cables such as fiber cables to be terminated, spliced, patched or stored at places along their length. Enclosures within the rack serve various functions, including operation as slack trays, splice trays, and cable organizers.

As needs for such cabling increase, the density requirements of each rack or enclosure increase. This results in increased demand for a good cable management system, particularly at points of termination or interconnection, as such systems have to accommodate a growing number of cables. Good cable management is particularly necessary in the case of fiber optic cables or category 5 or 6 cables, which have strict requirements for bend radius control to ensure adequate transmission of signal through the cable. Such cables have a low tolerance for bending and are subject to breakage or distortion of the signal if the bend is too severe. As such, it is critical for there to be adequate mechanisms provided to ensure that cable routing does not result in cable bends greater than design constraints. Moreover, such routing should efficiently guide cables toward the next connection element.

Various bend radius control devices have been provided to accommodate such problems. However, to date, such control devices have been designed as single unit devices that operate independently and work best for one or only a handful of cable configurations. As such, either a lot of different specific devices have to be built or purchased to accommodate a wide variety of cabling needs, or a more generic bend radius control fixture has to be provided that is designed to generally work with multiple cable needs. Such control fixtures thus either result in fixture manufacturers having to design, sell and market a large number of specific bend radius control fixtures, which also results in the end user having to stock a large number of such fixtures to meet needs, or a bend radius control fixture is used for applications it is not really suitable for, resulting in adequate or inferior cable management. Inadequate cable management can result in inferior cable signals or down time of the system diagnosing or repairing bad cable lines.

SUMMARY OF THE INVENTION

There is a need for a bend radius control fixture that is readily configurable to meet various cable management needs.

There also is a need for a modular bend radius control fixture that can handle all of the guiding and horizontal or vertical bend radius control needs of any rack or cable management system.

There further is a need for such a bend radius control fixture that can have a simple and effective mounting system for attaching various components of the fixture together.

There also is a need for such a bend radius control fixture mounting system that allows simple mounting of the fixture to a rack or enclosure, such as a ladder, rack.

It is an object of the invention to provide a bend radius control fixture that is flexible and can be readily adapted to individualized cable management needs of a particular enclosure system.

It is another object of the invention to provide a bend radius control fixture that is capable of addressing both horizontal and vertical bend radius requirements.

It is a further object of the invention to provide a simple mounting structure for mounting various components of the fixture together and for mounting the fixture to a rack or enclosure.

The above and other objects are achieved by providing a modular bend radius control fixture for guiding cabling, comprising: a main section having a curved surface with a predetermined radius that provides a first bend radius control surface and side walls; and a side plate section removably mounted to the side walls of the main section, the side plate section having a side wall that extends beyond the curved surface, wherein the modular bend radius control fixture is removably mountable to a cable management enclosure.

These objects and others are also achieved by providing a reconfigurable modular bend radius control fixture system for guiding cabling, comprising: at least one main section having a curved surface with a predetermined radius that provides a first bend radius control surface and side walls; at least one straight side plate section removably mountable to the side walls of the main section, the side plate section having a side wall that extends beyond the curved surface when mounted; and at least one bend radius control side plate removably mountable to the side walls of the main section, the bend radius control side plate section forming a second bend radius control surface, wherein combinations of the at least one main section, the at least one straight side plate section, and the at least one bend radius control side section can be assembled to form a customized bend radius control fixture mountable on a cable management enclosure.

BRIEF DESCRIPTION OF THE DRAWINGS

The foregoing and further objects, features and advantages of the present invention will become apparent from the following description of preferred embodiments with reference to the accompanying drawings, wherein:

FIG. 5 is a perspective view of various configurations of modular bend radius control fixtures mounted to a ladder rack of a fiber optic cable frame system;

FIG. 6 is a cross-sectional view of the leftmost main plate section of FIG. 5 taken along line 6—6;

FIG. 7 is a cross-sectional view of the rightmost main plate section of FIG. 5 taken along line 7—7;

DETAILED DESCRIPTION OF PREFERRED EMBODIMENTS

Figure 1:
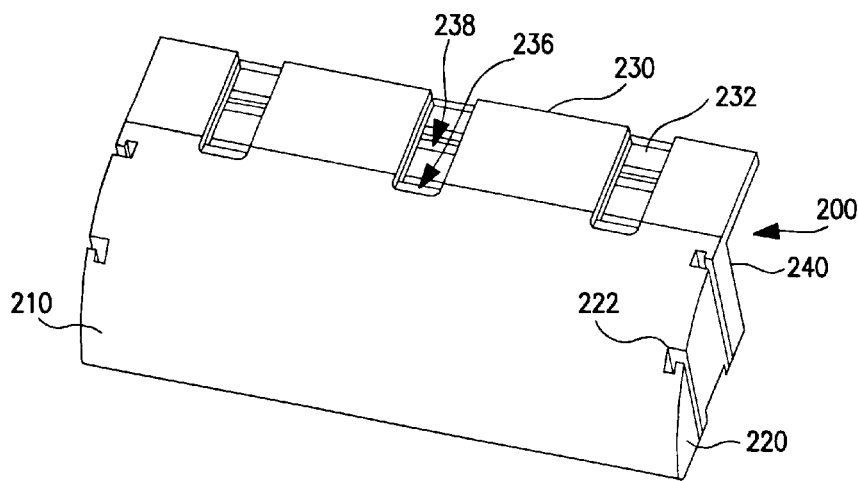
FIG. 1 is a perspective view of a main plate section for a modular bend radius control fixture according to the invention.
Figure 2:
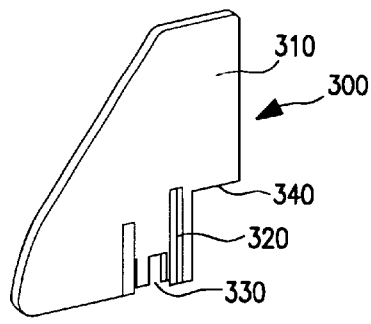
FIG. 2 is a perspective view of a straight side plate section for the modular bend radius control fixture according to the invention.
Figure 3:
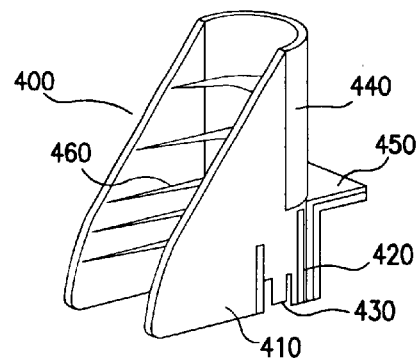
FIG. 3 is a perspective view of a horizontal bend radius side plate section for the modular bend radius control fixture according to the invention.
Figure 4:
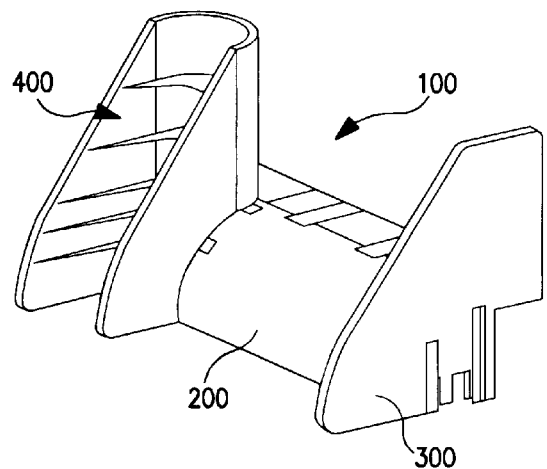
FIG. 4 is a perspective view of a first exemplary configuration of the modular bend radius control fixture according to the invention.
Figure 8:
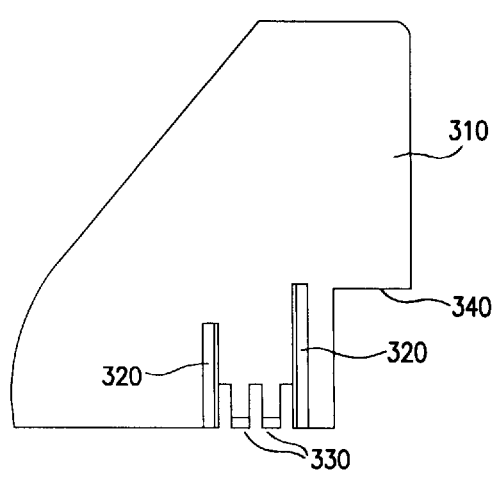
FIG. 8 is a side view of the straight side plate section according to the invention.
Figure 9:
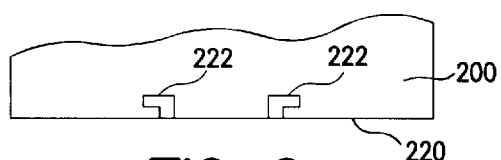
FIG. 9 is a partial top view of the main plate section according to the invention.
Figure 10:
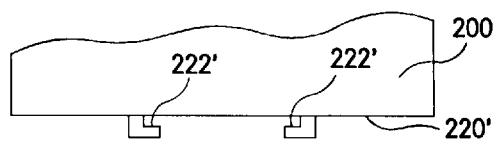
FIG. 10 is a partial top view of the main plate section according to an alternative embodiment of the invention.
Figure 11:
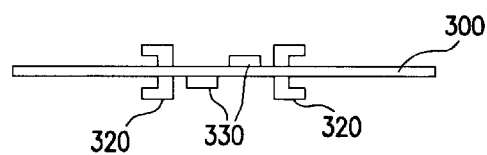
FIG. 11 is a top view of the side plate section according to the invention.

An embodiment of a bend radius control fixture 100 according to the invention will be described with reference to FIGS. 1–4, in which FIG. 1 shows a main bends radius control section 200, FIG. 2 shows a straight side plate section 300, and FIG. 3 shows a horizontal bend radius side plate section 400. Various bend radius control fixtures 100 can be formed from individual ones of the three sections 200, 300 and 400, or from combinations of the three sections. FIG. 4 shows an example of a modular bend radius control fixture 100 made up of a combination of the sections 200, 300 and 400. The modular bend radius control fixture 100 can be mounted on a rack or frame of a cable management such as on the ladder rack 500 shown in FIG. 5. Fixture 100 can also be provided on a cable enclosure, such as a fiber optic cable enclosure.

Figure 12:
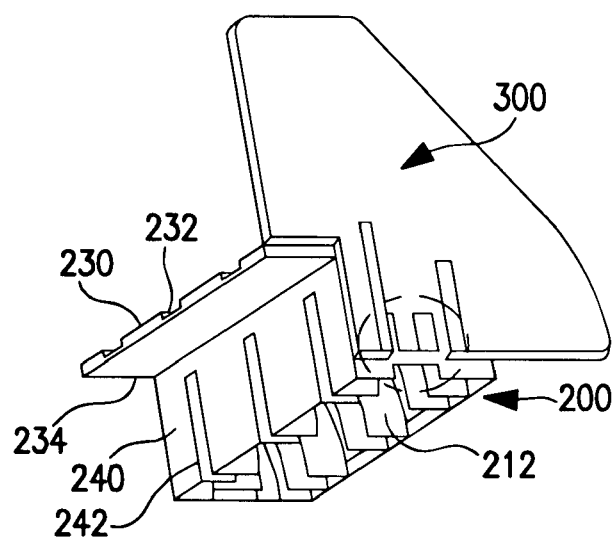
FIG. 12 is a perspective back view of the main plate section and straight side plate section according to the invention.

Main plate section 200 provides vertical bend radius control by providing a curved bend radius portion 210, which has a curvature corresponding to a desired minimum bend radius, such as a 2 inch radius. However, any desirable curvature can be used. The main plate section has a predefined width to accommodate a certain desirable number of cables. Main plate section 200 also includes grooved side walls 220 and a straight extended mounting portion 230 extending beyond a recessed vertical wall 240. Straight mounting portion 230 includes one or more, preferably three, recessed mounting grooves 232. First and second apertures 236, 238 may also be provided to receive the cable tie therethrough. Additionally, as best shown in FIG. 12, the recessed vertical support wall 240 has mounting notches 242 that also receive the cable ties. Additionally, the lower surface of the mounting portion 230 may include reinforcement ribs 234 and the curved bend radius control portion 210 may have internal reinforcement ribs 212.

Mounting of the main section 200 to a surface of a mount member, such as a ladder rack, is shown in FIGS. 6–7. The preferred mounting structure can accommodate a mounting surface having several possible configurations. For example, FIG. 6 shows mounting of the main plate section 200 to a stringer section of a rack, as in the leftmost bend radius control fixture of FIG. 5. FIG. 7 shows mounting of the main plate section 200 to a ladder section of a rack, such as in the rightmost bend radius control fixture of FIG. 5. In the case of mounting to a surface having a small thickness (FIG. 6), a cable tie, shown in dashed outline form, can be inserted into the inside of the main plate section 200, up through the first aperture 236, across a portion of the recessed mounting groove 232, down through the second aperture 238, and around the ladder section. Alternatively, in the case of a surface having a larger thickness (FIG. 7), a cable tie, shown in dashed outline form, can be inserted into the inside of the main plate section 200, up through the first aperture 236, across the entire recessed mounting groove 232, and around the rack 500. Alternatively, the cable tie may extend completely around the main plate section 200, including wrapping around the curved portion 210.

As best shown in FIGS. 1, 9, 10 and 13, main plate section 200 also includes recessed curved grooves or external curved tabs 222, 222' that mate with corresponding structure on side plate section 300, to be described later.

Figure 13:
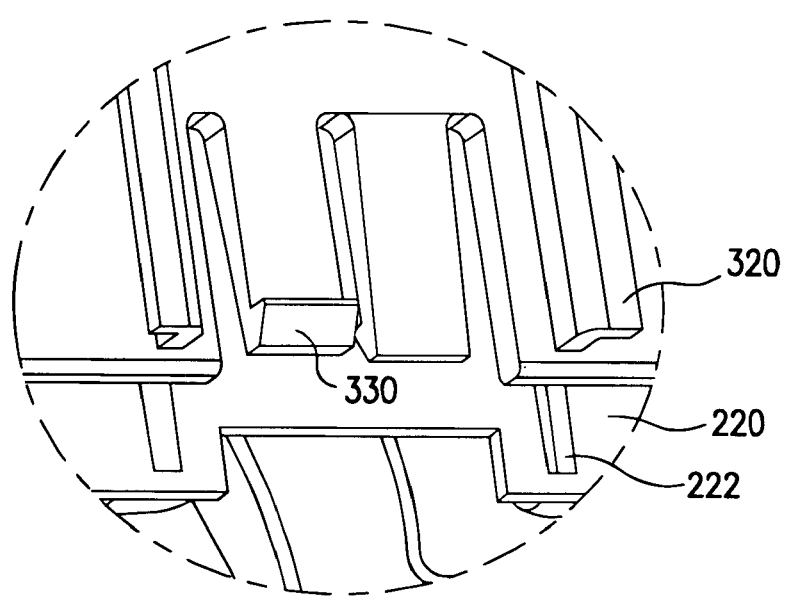
FIG. 13 is an exploded partial view of FIG. 12.
Figure 14:
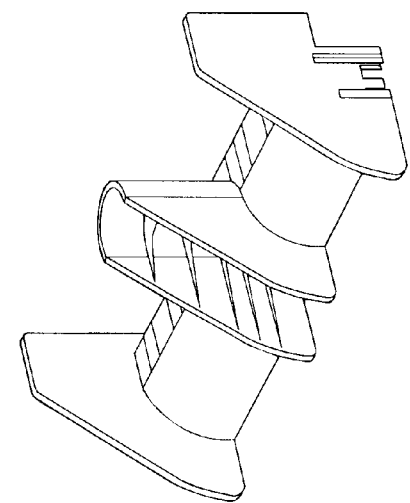
FIGS. 14–19 show various exemplary configurations of the modular bend radius control fixture according to the invention.
Figure 15:
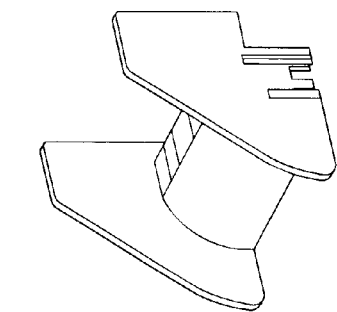
Figure 16:
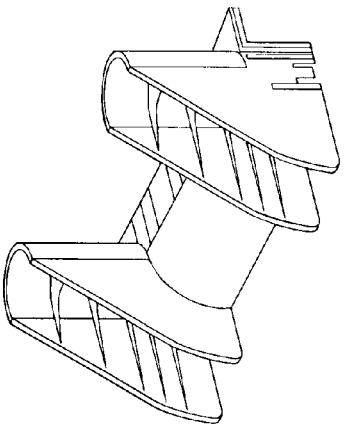
Figure 17:
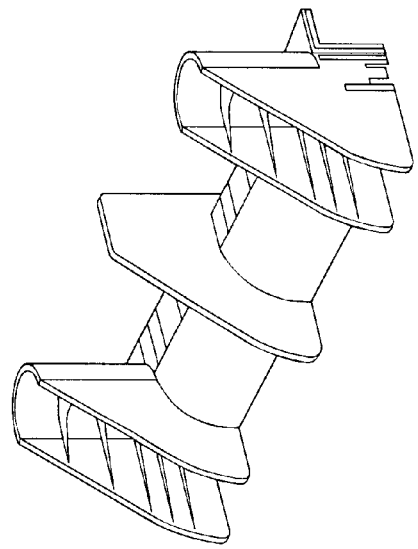
Figure 18:
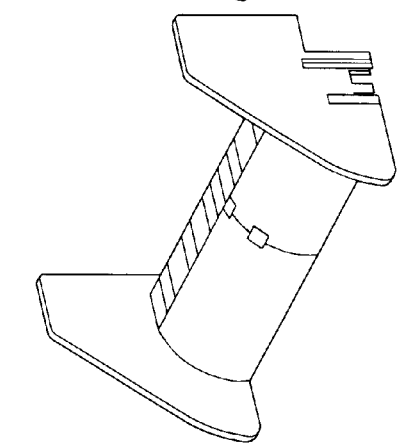
Figure 19:
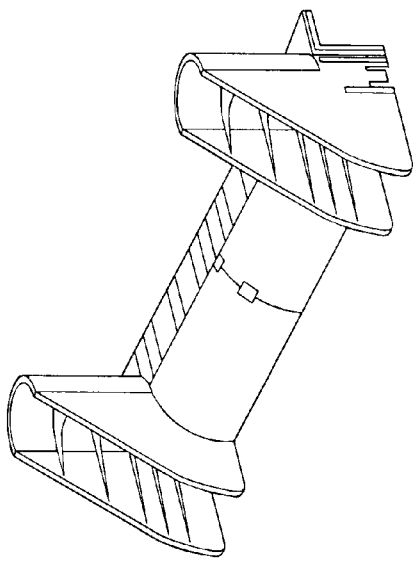

Referring to FIGS. 2, 8, 11 and 13, straight side plate section 300 includes a straight profile vertical wall 310, retention slides 320, at least one and preferably two retaining tabs 330, and a recessed support 340, which is preferably L-shaped. The profile of recessed support 340 corresponds to the edge profile of the main plate section and is designed to abut against a corner of the rack or enclosure for mounting purposes. Side plate section 300 can be removably mounted to the main plate section 200 by mating of the retention slides 320 with the corresponding grooves or tabs 222. This can be achieved by positioning the side plate section 300 alongside and above the main section 200 and aligning the retention slides 320 with the grooves 222. Then, the retention slides 320 are slid down the grooves 222 until the retention slides 320 abut a lower end of the grooves 222. That is, grooves 222 do not extend completely to the bottom of side walls 220 as best shown in FIG. 13. As such, side plate 300 is restricted from further downward movement by the grooves ending prior to the bottom of side walls 220. Moreover, once fully inserted, the retaining tabs 330 prevent further upward movement of the side plates 300 relative to the main plate 200. When mounted on a surface such as rack 500, a notched side wall may be formed or cutout to form a recessed notched wall 340 to allow full insertion of the side section 300 against the surface.

Referring to FIG. 3, horizontal bend radius side plate section 400 includes vertical side walls 410, retention slides 420, at least one and preferably two retaining tabs 430 on each side wall 410, a vertically extending curved horizontal bend radius surface 440, notched surface 450, and reinforcement ribs 460, which reinforce the horizontal bend radius control surface 440. The retention slides 420 and tabs 430 are the same as on the straight side section 300 and operate in the same manner to allow mounting of the horizontal side plate section 400 to the main plate section 200. The notched side wall 450 corresponds to the notched side wall 340 of the straight side plate section 300.

With these components, vertical bend radius control is provided by the large main plate section 200. Side plates 300, 400 may be added to provide cable bundle guiding and/or horizontal bend radius control. The side plates 300, 400 can be added to either side. With these three components, a variety of bend radius control configurations can be designed that will meet the cable management needs of any enclosure system. For example, in FIG. 4, vertical and horizontal bend radius control can be achieved. Variants of this are shown in FIGS. 5 and 14–19. The examples of FIGS. 5, 14, 16, 17 and 19 can be made in an integrated manner in which all of the elements are snap-fit together. However, variants are not limited to this. The examples of FIGS. 16 and 18 actually are two smaller integral units placed side by side, as the two main plate sections are not connectable to each other directly. Any of these fixtures 100 can be mounted by the methods disclosed in FIGS. 6 and 7. Moreover, horizontal bend radius side plate section 400 can be adapted to include similar cable mounting structure so that it can be independently mounted to the rack by one or more cable ties, without the need for a main plate section 200.

Figure 20:
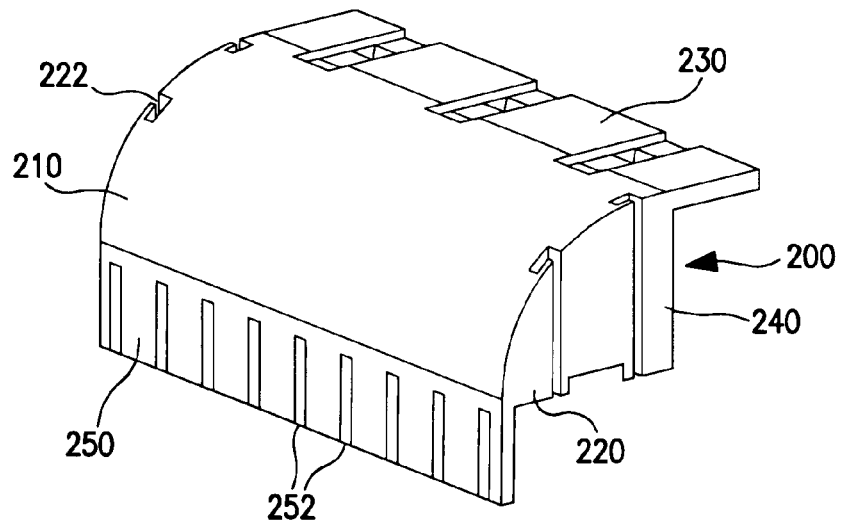
FIG. 20 is a perspective view of a main plate section for a modular bend radius control fixture according to another embodiment of the invention.
Figure 21:
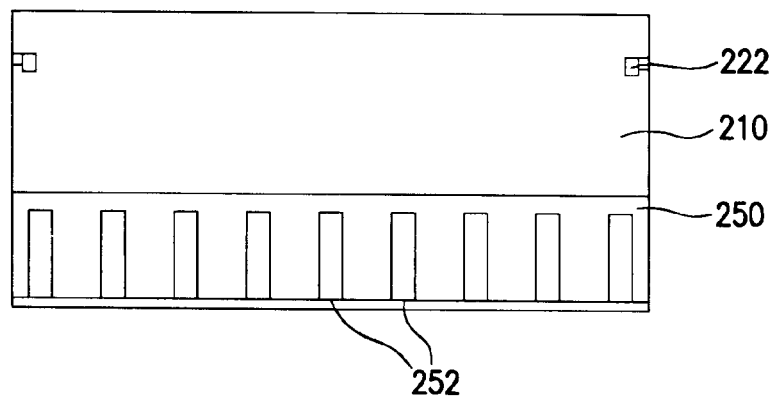
FIG. 21 is a side view of the main plate section of FIG. 20.

An additional embodiment of the invention will be described with reference to FIGS. 20–21. This embodiment includes all of the features of the previous embodiment of FIG. 1, plus additionally includes another straight extended portion 250 that extends from the opposite end as portion 230. Straight extended portion 250 preferably includes one or more slots that can accommodate cable ties or velcro straps to provide additional cable management options to the user by allowing various cables to be securely bundled in a predetermined orientation or relationship to other cables. By the extended portion 250 extending below the main section 210, access to the back side of the slots 252 is enhanced. In a preferred embodiment, nine cable slots 252 are longitudinally dispersed along the extended portion 250.

While the systems of the invention have been described in conjunction with the specific embodiments outlined above, it is evident that many alternatives, modifications and variations will be apparent to those skilled in the art. For example, the mounting structure on the main section and side sections can be removed or oriented in any direction. Accordingly, the exemplary embodiments are intended to be illustrative, not limiting. Various changes may be made without departing from the spirit and scope of the invention.

What is claimed is:

1. A reconfigurable modular bend radius control fixture system for guiding cabling, comprising:
    at least one main section having a curved surface with a predetermined radius that provides a first bend radius control surface and side walls;
    at least one straight side plate section removably mountable to said side walls of said main section, said side plate section having a side wall that extends beyond said curved surface when mounted; and,
    at least one bend radius control side plate removably mountable to said side walls of said main section, said bend radius control side plate section forming a second bend radius control surface,
    wherein combinations of said at least one main section, said at least one straight side plate section, and said at least one bend radius control side section can be assembled to form a customized bend radius control fixture mountable on a mount member of a cable management system.

2. The reconfigurable modular bend radius control fixture according to claim 1, wherein the second bend radius control surface provides horizontal bend radius control.

3. The reconfigurable modular bend radius control fixture according to claim 1, wherein the first bend radius control surface provides vertical bend radius control.

4. The reconfigurable modular bend radius control fixture according to claim 1, wherein both vertical and horizontal bend radius control are provided by the fixture.

5. A modular bend radius control fixture for guiding cabling, comprising:
    a main section having a curved surface with a predetermined radius that provides a first bend radius control surface and side walls; and
    a side plate section removably mounted to said side walls of said main section, said side plate section having a curved surface with a predetermined radius that provides a second bend radius control surface, said second bend radius control surface provides horizontal bend radius control,
    wherein said modular bend radius control fixture is mountable to a mount member of a cable management system.

6. A modular bend radius control fixture for guiding cabling, comprising:
    a main section having a curved surface with a predetermined radius that provides a first bend radius control surface and side walls, said first bend radius control surface provides vertical bend radius control; and
    a side plate section removably mounted to said side walls of said main section, said side plate section having a curved surface with a predetermined radius that provides a second bend radius control surface, said second bend radius control surface provides horizontal bend radius control,
    wherein said modular bend radius control fixture is mountable to a mount member of a cable management system.

7. A modular bend radius control fixture for guiding cabling, comprising:
    a main section having a curved surface of a predetermined radius that provides a first bend radius control surface and side walls, said main section including at least one recessed groove for receiving a cable tie mounting strap; and
    a side plate section removably mounted to said side walls of said main section, said side plate section having a side wall that extends beyond said curved surface,
    wherein said modular bend radius control fixture is mountable to a mount member of a cable management system.

8. A modular bend radius control fixture for guiding cabling, comprising:
    a main section having a curved surface of a predetermined radius that provides a first bend radius control surface and side walls, said main section including at least one recessed groove for receiving a cable tie mounting strap, said recessed groove including a first aperture at a rear of said recessed groove for receiving the cable tie therethrough; and
    a side plate section removably mounted to said side walls of said main section, said side plate section having a side wall that extends beyond said curved surface, wherein said modular bend radius control fixture is mountable to a mount member of a cable management system.

9. A modular bend radius control fixture for guiding cabling, comprising:

a main section having a curved surface of a predetermined radius that provides a first bend radius control surface and side walls, said main section including at least one recessed groove for receiving a cable tie mounting strap, said recessed groove including a first aperture at a rear of said recessed groove and a second aperture between the first aperture and a front of said recessed groove for receiving the cable tie therethrough; and a side plate section removably mounted to said side walls of said main section, said side plate section having a side wall that extends beyond said curved surface, wherein said modular bend radius control fixture is mountable to a mount member of a cable management system.

10. A modular bend radius control fixture for guiding cabling, comprising:

a main section having a curved surface with a predetermined radius that provides a first bend radius control surface and side walls, said main section including at least one slot for receiving a cable tie to secure one or more cables to the main section; and a side plate section removably mounted to said side walls of said main section, said side plate section having a side wall that extends beyond said curved surface;

wherein said modular bend radius control fixture is mountable to a mount member of a cable management system.

11. A modular bend radius control fixture for guiding cabling, comprising:

a main section having a curved surface with a predetermined radius that provides a first bend radius control surface and side walls; and a side plate section removably mounted to said side walls of said main section, said side plate section having a side wall that extends beyond said curved surface, said side wall of said side plate section serves as a guide for cables placed on said main section, wherein one of said side plate section and said side walls of said main section include at least one mounting tab and said other includes at least one retention slide slidable within said mounting tab, wherein upon insertion of said at least one retention slide into said at least one mounting tab, said side plate section and said main section are fixed in a first direction, wherein one of said side plate section and said side walls of said main section further includes at least one retaining tab that provides a stop in a second direction, wherein said modular bend radius control fixture is mountable to a mount member of a cable management system.

* * * * *